United States Patent
Onishi et al.

(10) Patent No.: US 9,182,488 B2
(45) Date of Patent: Nov. 10, 2015

(54) METHOD AND DEVICE FOR DETECTING TARGET OBJECT

(75) Inventors: Yuriko Onishi, Nishinomiya (JP); Satoshi Misonoo, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 731 days.

(21) Appl. No.: 13/311,220

(22) Filed: Dec. 5, 2011

(65) Prior Publication Data

US 2012/0140596 A1 Jun. 7, 2012

(30) Foreign Application Priority Data

Dec. 6, 2010 (JP) ................. 2010-271075

(51) Int. Cl.
*G01S 15/00* (2006.01)
*G01S 15/96* (2006.01)
*G01S 7/527* (2006.01)
*G01S 17/89* (2006.01)

(52) U.S. Cl.
CPC .............. *G01S 15/96* (2013.01); *G01S 7/527* (2013.01); *G01S 17/89* (2013.01)

(58) Field of Classification Search
USPC .......................................... 367/93
See application file for complete search history.

(56) References Cited

U.S. PATENT DOCUMENTS

| | | | | | |
|---|---|---|---|---|---|
| 3,968,499 | A | * | 7/1976 | Lowe ................... | G01D 1/12 345/24 |
| 4,135,815 | A | * | 1/1979 | Masunaga ............ | G02B 7/305 250/201.7 |
| 4,309,763 | A | * | 1/1982 | Passmore ............. | G01V 1/3808 327/100 |
| 4,532,867 | A | * | 8/1985 | Mitchell ............... | G01S 7/493 102/213 |
| 4,777,630 | A | * | 10/1988 | Burns ................... | G01S 7/526 342/94 |
| 4,980,865 | A | * | 12/1990 | Ishibashi .............. | G01S 15/8993 367/11 |
| 6,812,882 | B2 | * | 11/2004 | Ono ...................... | G01S 13/34 342/114 |
| 6,975,735 | B1 | * | 12/2005 | Kinoshita ............. | G10H 3/14 181/148 |
| 2008/0080317 | A1 | * | 4/2008 | Inouchi ................. | G01S 7/539 367/112 |

FOREIGN PATENT DOCUMENTS

| | | |
|---|---|---|
| CN | 1459028 A | 11/2003 |
| JP | 5-196733 A | 8/1993 |
| JP | 2001-133548 A | 5/2001 |
| JP | 2002-277537 A | 9/2002 |

OTHER PUBLICATIONS

Office Action of the corresponding Chinese Patent Application No. 201110396884.3, dated Oct. 28, 2014.

* cited by examiner

*Primary Examiner* — Naomi Small
(74) *Attorney, Agent, or Firm* — Global IP Counselors, LLP (57) ABSTRACT

This disclosure provides a target object detection device for outwardly transmitting a detection pulse and detecting a target object based on a returned reception signal. The device includes a first peak holding module for extracting, at every predetermined cycle, a maximum value of the reception signals obtained in the predetermined cycle, a second peak holding module for extracting, at the same predetermined cycle, a minimum value of the reception signals obtained in the predetermined cycle, and a target object determiner for determining a level rising and a level falling of the reception signal indicating the target object by using a gradient between the minimum and maximum values extracted at different peak holding positions.

8 Claims, 5 Drawing Sheets

METHOD AND DEVICE FOR DETECTING TARGET OBJECT

CROSS-REFERENCE TO RELATED APPLICATION(S)

The application claims priority under 35 U.S.C. §119 to Japanese Patent Application No. 2010-271075, which was filed on Dec. 6, 2010, the entire disclosure of which is hereby incorporated by reference.

TECHNICAL FIELD

The present invention relates to a method and a device for outwardly transmitting a detection pulse and detecting a target object based on a returned reception signal.

BACKGROUND OF THE INVENTION

Conventionally, a quantitative school of fish detector for performing a quantitative measurement of fish for the purpose of, for example, a fishery resources research has been known. This kind of quantitative school of fish detector obtains a ratio of a sound pressure level of an ultrasonic wave discharged from a transducer and a sound pressure level of an echo that is reflected by a fish, that is, a reflection strength TS (target strength), and calculates a length of the fish from the reflection strength TS by using a relation of the reflection strength TS and a fish body length L.

In a quantitative measurement of fish, a single fish needs to be detected discriminately from a school of fish. For example, JP05-196733A discloses a single fish determination circuit using ultrasonic wave transmission pulses with two kinds of pulse widths, respectively. That is, according to the description in JP05-196733A, two kinds of ultrasonic transmission pulses with long and short pulse widths, respectively, are sequentially transmitted and, after reception signals of these pulses are formed into a rectangular shape, it is determined whether the reception signals are from a single fish based on a ratio of the rectangular widths of the corresponding reception signals. For the determination, phenomena is utilized in which in a case of the single fish, the ratio of the rectangular widths of the two long and short reception signals remains within a predetermined range known in advance, whereas, in a case of other cases including a school of fish, because the rectangular widths of the reception signals become longer as a length of the school of fish increases in the advancing direction of the ultrasonic wave, and the ratio is different from the case of the single fish case.

In JP05-196733A, because the two kinds of ultrasonic transmission pulses with the long and short pulse widths, respectively, are used, a configuration of the circuit for the above ultrasonic transmission pulses is needed, and the transmission of the ultrasonic transmission pulses with the long and short pulse widths, that is the two wave transmissions, correspond to a single detection operation, therefore, detection efficiency correspondingly degrades.

Meanwhile, a method of detecting a single fish from reception signals of a single frequency ultrasonic wave transmission signals by extracting rising and falling components thereof is also known. This detecting method is, for example, a method of sampling the reception signals at a high sampling speed and detecting the rising and falling components from the sampled signals, and a method of obtaining an average value or extracting a maximum value of the reception signals for each sampling period at a sampling speed slower than the above high-speed sampling, and detecting the rising and falling components by using the signals. However, with this method, an amount of data that is sampled at the high sample speed becomes extremely large and interferes with high-speed processing. Further, in the case where the rising and falling components are to be detected by using data processed through the average value processing and the maximum value processing, there has been a certain limit to an accuracy in detecting the single fish.

SUMMARY OF THE INVENTION

The present invention is made in view of the above situations and provides a method and a device for detecting a target object, in which maximum and minimum values of reception signals in a predetermined cycle are extracted for every cycle, and the target object, such as a single fish, can highly accurately be detected based on an inclination obtained from a difference between the maximum and minimum values.

According to one aspect of the invention, a target object detection device for outwardly transmitting a detection pulse and detecting a target object based on a returned reception signal is provided. The device includes a first peak holding module for extracting, at every predetermined cycle, a maximum value of the reception signals obtained in the predetermined cycle, a second peak holding module for extracting, at the same predetermined cycle, a minimum value of the reception signals obtained in the predetermined cycle, and a target object determiner for determining a level rising and a level falling of the reception signal indicating the target object by using a gradient between the minimum and maximum values extracted at different peak holding positions.

According to another aspect of the invention, a method of outwardly transmitting a detection pulse and detecting a target object based on a returned reception signal is provided. The method includes extracting, at every predetermined cycle, a maximum value of the reception signals obtained in the predetermined cycle, extracting, at the same predetermined cycle, a minimum value of the reception signals obtained in the predetermined cycle, and determining a level rising and a level falling of the reception signal indicating the target object by using a gradient between the minimum and maximum values extracted at different peak holding positions.

In these aspects, when the detection pulse is transmitted outward, if the target object as a detection target exists, the pulse is reflected by the target object, the returned signal is received, and the target object is determined based on the reception signal. That is, at every predetermined cycle, the maximum value of the reception signals obtained in the predetermined cycle is extracted, and similarly, the minimum value in the predetermined cycle is extracted. Further, the gradient between the minimum value and maximum value extracted at the different peak holding positions, such as, the adjacent positions or positions distanced by a plurality of positions is obtained. Next, the calculated gradient is determined whether it indicates either one of the level rising and the level falling of the signal indicating the target object. When a pair of the level rising and falling is determined, the target object is detected. As above, in determining the target object, by adopting the minimum value that is not in the idea of the conventional art, and also determining the level rising of the signal indicating the target object by using the difference value between the minimum and maximum values and determining the level falling of the signal indicating the target object by using the difference value between the maximum and minimum values, the determination of the target object can be performed in the similar extent of the conventional case of determining with the enormous size of data acquired by the high speed sampling, and a determination accuracy higher than the determination using the average value obtained in the cycle corresponding to the predetermined cycle or using only the maximum value can be obtained.

The target object determiner may calculate the gradient based on the minimum and maximum values at the peak holding positions distanced by one or more of the predetermined cycles.

With this configuration, by further clarifying the difference value between the minimum and maximum values, the level rising and falling of the signal indicating the target object can accurately be detected.

The target object determiner may compare, with a rising determination threshold, a difference value between the minimum and maximum values used in calculating the gradient of the level rising, and if the difference value exceeds the rising determination threshold, the determiner may determine that the difference value indicates the level rising of the signal indicating the target object.

With this configuration, whether the difference value is the level rising is determined by comparing with the rising determination threshold. Thus, the level rising can stably and accurately be detected.

The target object determiner may compare, with a falling determination threshold, a difference value between the maximum and minimum values used in calculating the gradient of the level falling, and if the difference value exceeds the falling determination threshold, the determiner may determine that the difference value indicates the level falling of the signal indicating the target object.

With this configuration, whether the difference value is the level falling is determined by comparing with the falling determination threshold. Thus, the level falling can stably and accurately be detected.

The first and second peak holding modules may change the predetermined cycle according to a detection range setting.

With this configuration, in displaying the detection image, the number of the signals to be displayed corresponds to the number of displaying pixels (pixels) of a display, thus, display processing correspondingly becomes simple.

The detection pulse may be an ultrasonic pulse that is transmitted underwater, and the target object determiner may determine a single fish as the target object.

With this configuration, the detection of the single fish underwater can highly accurately be performed.

According to the aspects of the invention, the target object as the detection target can highly accurately be detected.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENTS

Figure 1:
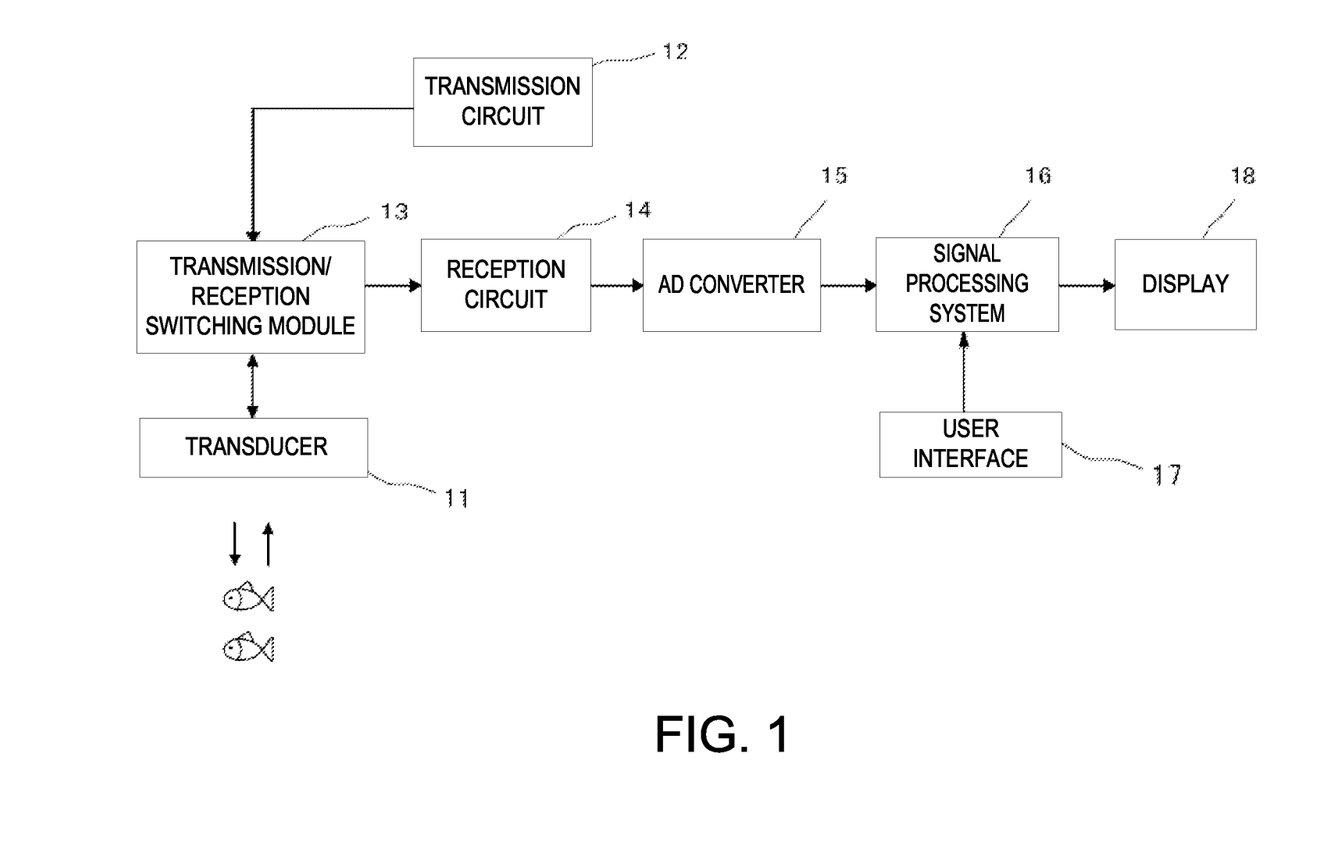
FIG. 1 is a block diagram showing an example of a configuration of an underwater detection device to which a target object detection device according to an embodiment of the present invention is applied.

Next, an embodiment of the present invention is described with reference to the appended drawings. FIG. 1 is a block diagram showing an example of a configuration of an underwater detection device to which a target object detection device according to an embodiment of the present invention is applied. An underwater detection device 10 is equipped on, for example, a bottom of a ship and includes a transducer 11 arranged with one or more ultrasonic oscillators. The transducer 11 transmits ultrasonic wave beams with a narrow directivity of, for example, a few to substantially 10° toward a downward transmission direction, preferably directly downward. A transmission circuit 12 generates a drive signal with a predetermined pulse width for exciting the one or more ultrasonic oscillators constituting the transducer 11. Note that, in the mode where the transducer 11 is constituted with a plurality of ultrasonic wave oscillators, a required directivity in width may be obtained by performing a weighting or a phase control to the exciting signal (transmission trigger) of each ultrasonic oscillator. A transmission/reception switching module 13 leads the drive signal from the transmission circuit 12 to the transducer 11 and leads to a reception circuit 14 a signal that is received by the transducer 11 immediately after the transmission of the ultrasonic wave beam.

The reception circuit 14 performs, on the reception signal that is reflected by and returned from an underwater target object and is received by the transducer 11, TVG amplifying processing to compensate for absorption and subsiding of the ultrasonic wave due to the propagation underwater and filtering processing to intercept an unnecessary noise signal component in the signal. The reception circuit 14 outputs to an AD converter 15 the amplifying-processed or filtering-processed signal after performing detecting processing thereon. The AD converter 15 converts the detecting-processed reception signal into digital reception data at a predetermined sampling cycle (in a frequency, between 10 to 190 KHz, for example, 100 KHz).

A signal processing system 16 performs predetermined processings on the sampled reception data. Here, the predetermined processings are, for example, peak holding processing, single fish discriminating processing, fish body quantitative processing, and displaying processing (details thereof are described below).

The underwater detection device 10 includes a predetermined housing, and a user interface 17 and a display 18 are equipped on the housing. The user interface 17 has various kinds of operation members, such as various keys and buttons, and instructs the signal processing system with settings of a detection condition, such as a detection range, and various conditions relating to displaying. The display 18 is configured with, a displaying member, such as a liquid crystal panel, having a predetermined number of pixels (display pixels) in a screen 181 in vertical and lateral directions thereof, and displays images of the reception signal in a predetermined display mode.

Figure 5:
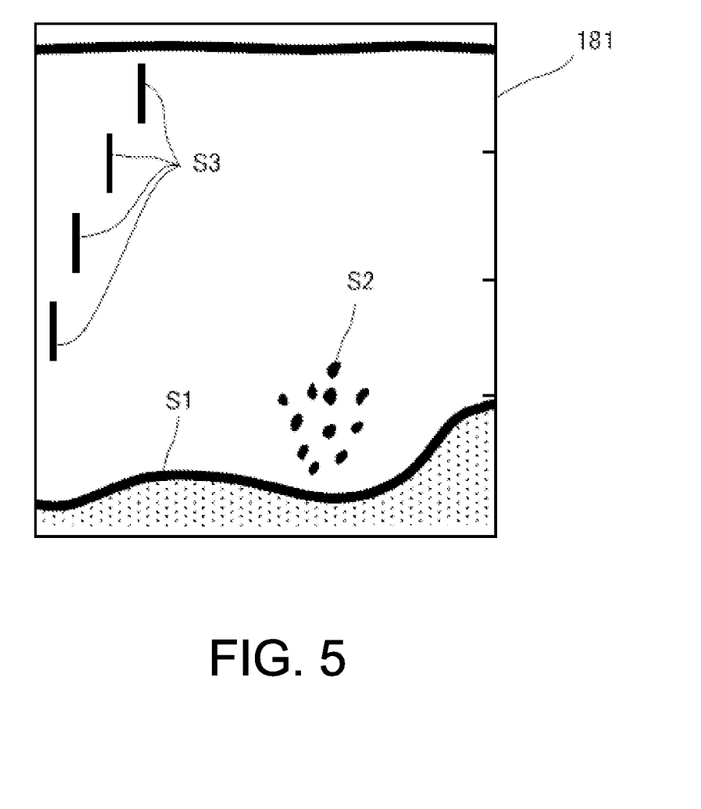
FIG. 5 is a view showing an example of a mode of displaying a detection image.

The screen 181 of the display 18 is displayed with a detection image by the signal processing system 16. FIG. 5 is a view showing an example of a display mode of a detection image. On the screen 181, a depth direction is set in the vertical direction and the number of detections (time-elapsing direction) is set in the lateral direction. The detection image for one detection is drawn along a vertical line having a predetermined narrow width and formed by, for example, a column of pixels. In a case of displaying the reception signal in a monochrome view, the signal is converted into an intensity according to a reception strength, and in a case where a color image can be displayed, the reception signal is converted into a color according to the reception strength. On the screen 181, each detection image is scrolled to the next line in the time-elapsing direction (leftward in FIG. 5) every time the ultrasonic wave transmission pulse is transmitted, and a latest detection image is drawn on the right end line. Images including a sea bottom image S1, a single fish image S2, and an unnecessary image S3, such as an interference wave, are displayed on the screen 181.

Figure 2:
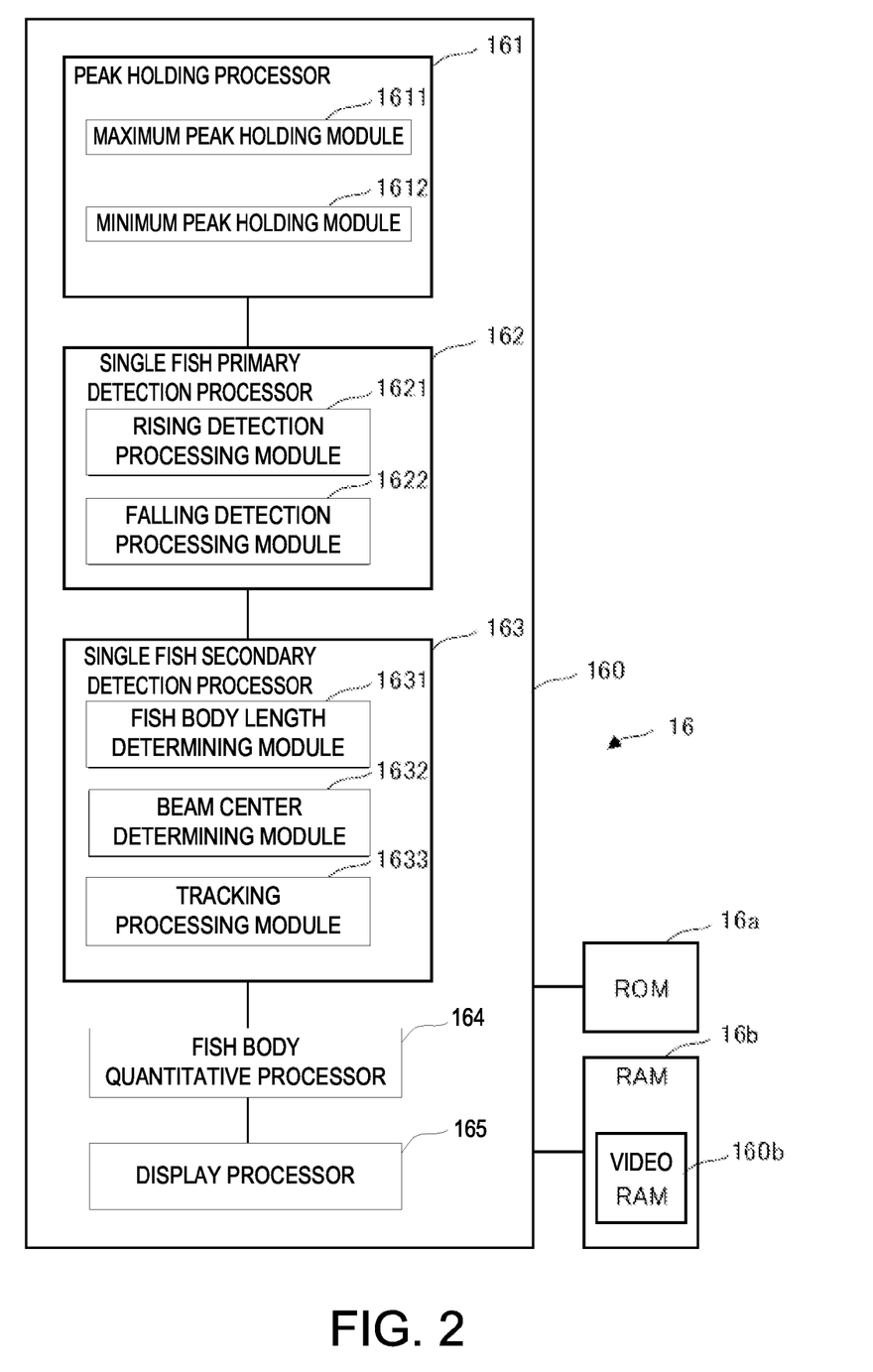
FIG. 2 is a block diagram showing an example of a configuration of a signal processing system in FIG. 1.

FIG. 2 is a block diagram showing an example of a configuration of the signal processing system 16 in FIG. 1. The signal processing system 16 includes a control unit 160 constituted by, for example, a micro computer, and a ROM 16a and a RAM 16b connected with the control unit 160. The ROM 16a stores, for example, an operation program for the signal processing, and predetermined data and parameters for the operation program. The RAM 16b temporarily saves data during the processing. The RAM 16b includes a video RAM module 160b having a storing capacity corresponding to the number of the pixels configuring the screen 181 of the display 18.

By performing the operation program stored in the ROM 16a, the control unit 160 functions as a peak holding processor 161 for performing the peak holding processing at a predetermined cycle on the reception data acquired through the AD conversion, a single fish primary detection processor 162 for primarily determining a candidate of a single fish based on a predetermined condition, a single fish secondary detection processor 163 for performing narrowing processing of the single fish from the primary candidates based on another condition, a fish body quantitative processor 164 for calculating, for example, a fish body length L from a reflection strength TS (Target Strength), and a display processor 165 for performing the processing of displaying on the display 18, for example, the image of the reception signal and information after the processings.

The peak holding processor 161 includes a maximum peak holding module 1611 for extracting, at every predetermined cycle (hereinafter, may be referred to as "the peak holding cycle"), a maximum value (Max) of the reception data within the peak holding cycle, a minimum peak holding module 1612 for extracting, at every peak holding cycle, a minimum value (Min) of the reception data within the peak holding cycle. The peak holding processing generates data for a later described single fish determination by using the reception data sampled by the AD converter 15 in this embodiment.

The peak holding cycle is substantially the same or longer than the sampling cycle set by the AD converter 15. Although there are various methods of setting the cycle, in this embodiment, the method is changed according to, for example, the detection range. Further specifically, the peak holding cycle is on the basis of, for example, a shortest detection range that is set in the underwater detection device 10, and in a case where the detection range is set to be, for example, double the shortest detection range, a unit distance that a single pixel represents in the vertical direction of the screen 181 of the display 18 is doubled and, as a result, the peak holding cycle is changed to be doubled. In this case, the shortest detection range, that is the peak holding cycle to be the basis, may be set in accordance with the sampling cycle by the AD converter 15.

The peak holding processor 161 sets the peak holding cycle according to information on a detection range set by the user interface 17, and repeats the peak holding processing on the reception data from the AD converter 15 at the set peak holding cycle. Further specifically, the maximum peak holding module 1611 loads the reception data, which is obtained by the AD converter 15, in the sequence of being sampled, compares sizes of the data in the previous loading and the data in the latest loading with each other, and performs processing of storing the larger data within the peak holding cycle in series. Thereby, the maximum peak data for one maximum peak holding cycle can be extracted. The maximum peak data extracted at every peak hold cycle is stored in the RAM 16b in series. Similarly, the minimum peak data is extracted at every peak hold cycle by the minimum peak holding module 1612, and the extracted minimum peak data is associated with the maximum peak data at the same peak holding position as the minimum peak data and is stored in the RAM 16b in series.

Figure 3:
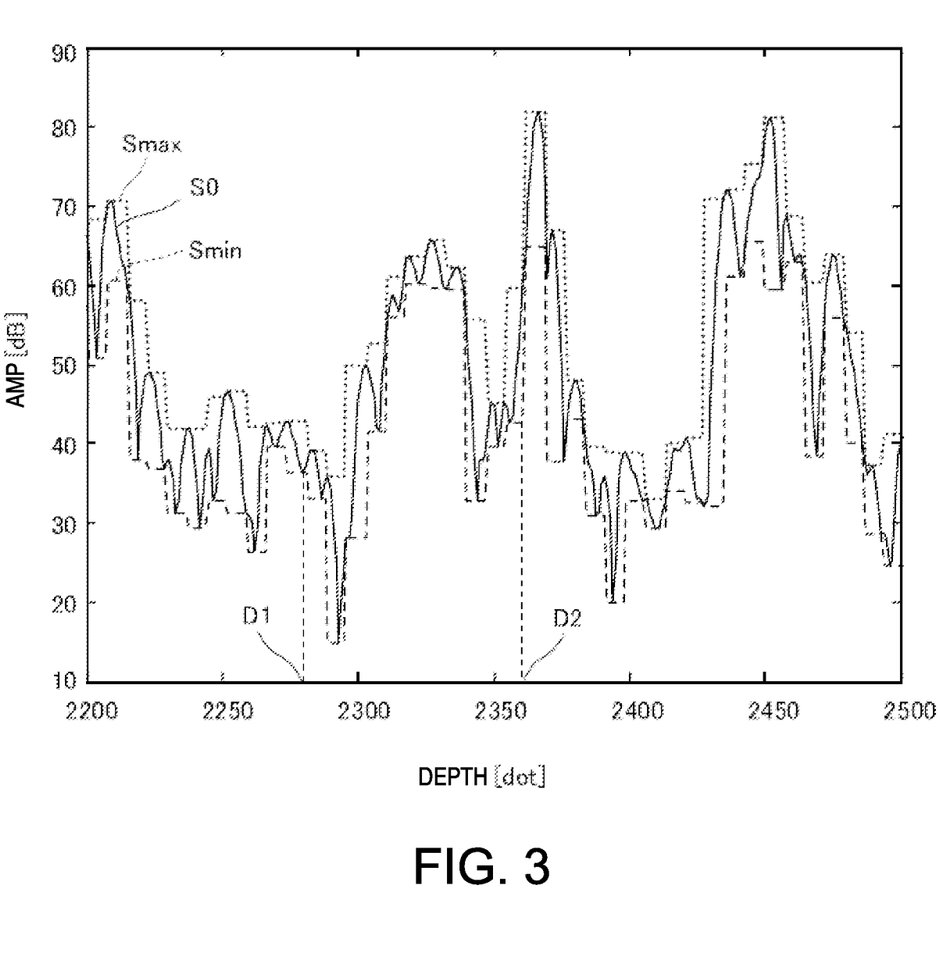
FIG. 3 is a part of a data chart showing an example of sampled reception data and a relation between maximum peak holding data and minimum peak holding data.

FIG. 3 is a part of a data chart showing an example of the reception data and a relation between the maximum peak holding data and the minimum peak holding data. In FIG. 3, the vertical axis indicates a signal strength, and the lateral axis corresponds to a depth direction. The dot value in the lateral axis is a count value indicating the number of samplings by the AD converter 15 and FIG. 3 includes data of the count values from "2200" to "2500."

For example, if the sampling frequency of the AD converter 15 is set to 100 KHz and an underwater speed of the ultrasonic wave is set to 1500 m/s, a detection distance of the count value of "1" is "0.75 cm." In other words, a detection distance corresponding to the count values from "2200" to "2500" in FIG. 3 is from "16.5 m" to "18.75 m."

Further, the signal S0 in FIG. 3 indicates the reception data obtained by being sampled by the AD converter 15, the signal Smax indicates the maximum peak holding data extracted by the maximum peak holding module 1611, and the signal Smin indicates the minimum peak holding data extracted by the minimum peak holding module 1612. In this example, a single maximum peak holding data (also for the case of the minimum peak holding data) is set in every eight count values, that is, eight sampling data. Therefore, in the detection range in FIG. 3, the reception data is downsampled to one-eighth by the peak holding processing.

Next, the detection of the single fish is explained. The single fish detection processing is performed by the single fish primary detection processor 162 and the single fish secondary detection processor 163. The single fish primary detection processor 162 detects the primary candidate of the single fish from the peak holding data. The single fish primary detection processor 162 includes a rising detection processing module 1621 for detecting a level rising from data of the single fish, and a falling detection processing module 1622 for detecting a level falling from the data of the single fish.

The rising detection processing module 1621 calculates the level rising in the reception data by using the maximum and minimum peak holding data obtained by the peak holding processing, compares the calculated result with a threshold, and thereby, determines whether the data is the candidate for the single fish. Further, specifically, a difference value between a value of the minimum peak holding data at a certain peak holding position (first peak holding position) and a value of the maximum peak holding data at a second peak holding position that is on the deeper side of the first peak holding position by a predetermined depth (e.g., a peak holding position adjacent to the first peak holding position) so as to calculate an inclination of between the minimum and maximum peak data in the depth direction. Further, after comparing the calculated inclination with a rising determination threshold, if the calculated inclination exceeds the rising determination threshold, the inclination is determined as the level rising of the single fish.

The rising detection processing module 1621 repeats the inclination calculation processing from where the first peak holding position is at the initial peak holding position (the shallowest position) and shift in series in the depth direction, and detects a rising signal (i.e., the level rising) and position of the single fish satisfying the condition. Further, the rising detection processing module 1621 may use, alternatively/additionally to the inclination between the adjacent first and second peak holding positions, an inclination between predetermined distant positions, such as in a case where the first and second peak holding positions are distant by one or two peak holding positions, so as to further highly accurately detect the level rising. The rising determination threshold may be set according to the distance between the first and second peak holding positions.

The falling detection processing module 1622 calculates the level falling in the reception data by using the maximum and minimum peak holding data obtained by the peak holding processing, compares the calculated result with a threshold, and thereby, determines whether the data is the candidate for the single fish. Further, specifically, a difference value between a value of the maximum peak holding data at a certain peak holding position (first peak holding position) and a value of the minimum peak holding data at a second peak holding position that is on the deeper side of the first peak holding position by a predetermined depth (e.g., a peak holding position adjacent to the first peak holding position) so as to calculate an inclination of between the maximum and minimum peak data in the depth direction. Further, after comparing the calculated inclination with a falling determination threshold, if the calculated inclination exceeds the falling determination threshold, the inclination is determined as the level falling of the single fish.

The falling detection processing module 1622 repeats the inclination calculation processing from where the first peak holding position is at the initial peak holding position (the shallowest position) and shift in series in the depth direction, and detects a falling signal (i.e., the level falling) and position of the single fish satisfying the condition. Further, the falling detection processing module 1622 may use, alternatively/additionally to the inclination between the adjacent first and second peak holding positions, an inclination between predetermined distant positions, such as in a case where the first and second peak holding positions are distant by one or two peak holding positions, so as to further highly accurately detect the level falling. The falling determination threshold may be set according to the distance between the first and second peak holding positions.

Every time the first and second peak holding positions for the inclination calculation are set, the single fish primary detection processor 162 parallely executes the processings of the rising detection processing module 1621 and the falling detection processing module 1622, and detects the level rising and level falling in the reception data from the single fish.

Figure 4:
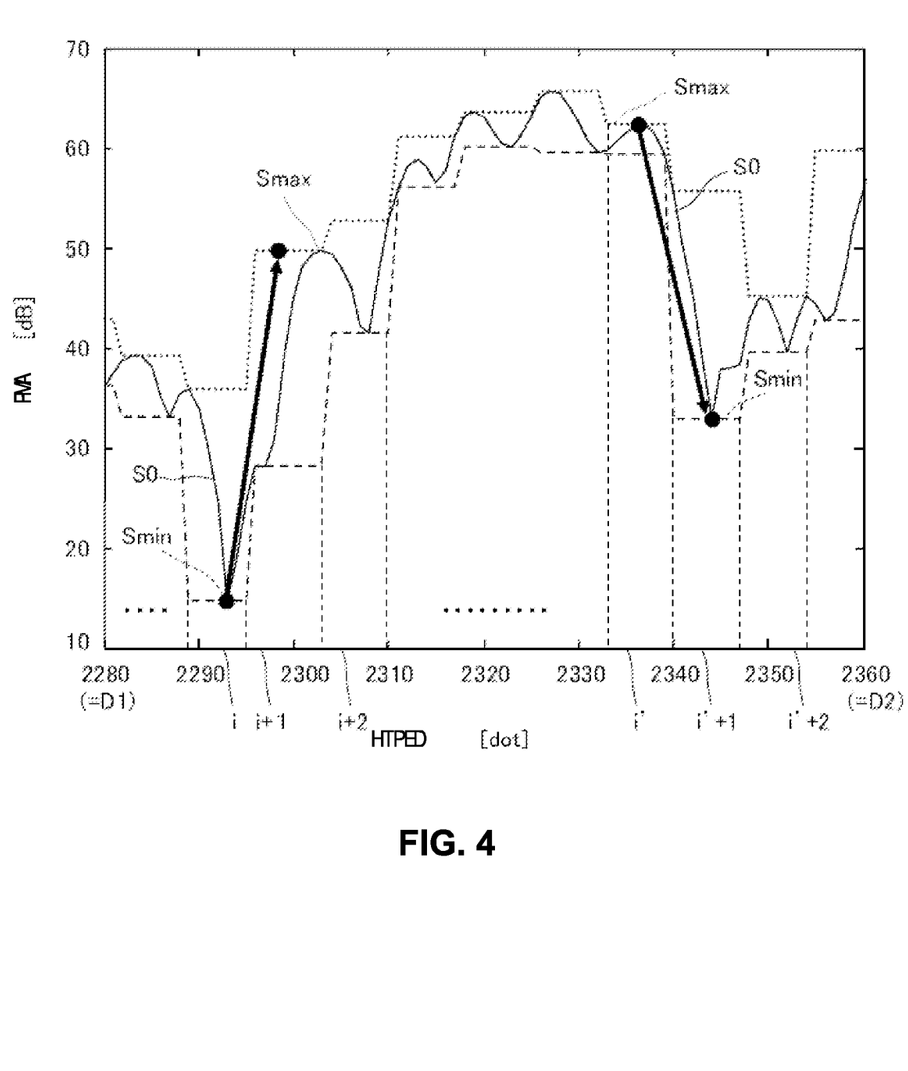
FIG. 4 is an enlarged chart of a part of the chart in FIG. 3, explaining a method of calculating an inclination between the maximum peak holding data and the minimum peak holding data.

FIG. 4 is an enlarged chart of a part of the chart in FIG. 3, and explains a method of calculating the inclination. The lateral axis corresponds to the part between the sampling positions D1 and D2 in FIG. 3. FIG. 4 shows the case where the first and second peak holding positions are adjacent to each other. That is, when calculating the rising inclination, the difference value indicating an increased value from minimum peak holding data at a peak holding position i to maximum peak holding data at a peak holding position (i+1) is calculated, and an inclination therebetween is calculated by using a distance between the peak holding positions in the depth direction, here, 1{=(i+1)−i}.

Further, if the rising determination threshold in the case with the adjacent peak holding positions is set to 15 (dB: decibel), the difference value is, with reference to FIG. 4: approximately 35 dB{=approximately 50 dB (the maximum peak holding data at the position (i+1))−approximately 15 dB (the minimum peak holding data at the position i)}, and the corresponding reception data is determined to be the single fish candidate.

Further, when calculating the falling inclination, the difference value indicating a decreased value from maximum peak holding data at a peak holding position i' to minimum peak holding data at a peak holding position (i'+1) is calculated, and an inclination therebetween is calculated by using a distance between the peak holding positions in the depth direction, here, 1{=i'−(i'+1)}.

Further, if the falling determination threshold in the case with the adjacent peak holding positions is set to 12 dB, the difference value is, with reference to FIG. 4: approximately 28 dB{=approximately 63 dB (the maximum peak holding data at the position i')−approximately 35 dB (the minimum peak holding data at the position (i'+1))}, and the corresponding reception data is determined to be the single fish candidate. The peak holding position i is set to be in a sequential order of 1, 2, 3, . . . as the processing proceeds to the next processing and reaches the end of the detection range.

Note that, in the mode in which the rising and falling determining processings are parallely performed, the rising determining processing at the peak holding positions i and (i+1) is performed as well as the falling determining processing at the peak holding positions i and (i+1) by obtaining the difference value between the maximum and minimum peak holding data at the positions i and (i+1), respectively, are performed. In this case, in the example shown in FIG. 4, the difference value in the falling determining processing is 8 dB (=approximately 36 dB (the value at the position i)−approximately 28 dB (the value at the position (i+1))), therefore, the falling determination threshold 12 dB is not satisfied, and the level falling is determined not to be caused by the single fish. Similarly, in the mode in which the falling determining processing as well as the rising determining processing for the peak holding positions i' and (i'+1) are performed, in the example shown in FIG. 4, the difference value in the rising determining processing is −25 dB (=approximately 35 dB (the value at the position (i'+1))−approximately 60 dB (the value at the position i'), therefore, the rising determination threshold 15 dB is not satisfied, and the level rising is determined not to be caused by the single fish. Further, at the same position, the level rising and level falling generally do not occur at the same time, therefore, if the data is determined to be the single fish candidate in one of the rising and falling determining processings, the other processing may be cancelled. Further, in improving detection accuracy, as another condition for determining the level rising and the level falling, a restriction regarding to the value of the minimum peak holding data may be set for the rising detection and a restriction regarding to the value of the maximum peak holding data may be set for the falling detection. Here, the restriction is defined as a case where the peak holding data itself exceeds the corresponding threshold.

Further, in the inclination calculation processing in the case of using the peak holding positions distanced by two peak holding positions, as shown in FIG. 4, a difference value between data at the peak holding positions i and (i+2) (or a difference value between data at the peak holding positions i' and (i'+2)) may be used, and, in this case, the inclination is half of the difference value.

Further, each pair of the adjacent data determined to be either one of the level rising and level falling of the single fish by the single fish primary detection processing serves as a pair of information, that is, the single fish signals of the primary candidates, and is stored in the RAM 16b per pair in series.

The fish secondary detection processor 163 performs the narrowing processing of the single fish on the single fish signals which are the primary candidates detected by the single fish primary detection processor 162 and stored in the RAM 16b based on the other condition, and includes a fish body length determining module 1631, a beam center determining module 1632, and a tracking processing module 1633. If a distance from the peak holding position of the level rising of the single fish detected as the primary candidate to the peak holding position of the level falling of the single fish detected as the primary candidate in the depth direction exceeds a preset value, for example, a distance corresponding to several times of a general fish body dimension, such as three times thereof, the fish body length determining module 1631 excludes the primary candidate from the single fish. By the determining processing above, an unnecessary signal with a comparatively long width, such as an interference signal, is not false determined as the single fish as a result (or effectively).

The beam center determining module 1632 is adopted as needed, and is actuated with a configuration equipped with, separately from the transducer 11 for transceiving the comparatively high frequency ultrasonic wave signal so as to obtain the reception signal for performing the peak holding processing and the single fish primary detection processing, a low frequency transducer for transceiving an ultrasonic wave signal with a relatively low frequency and a wide directivity (e.g., about 20°). The ultrasonic signal with the high frequency and the ultrasonic wave with the low frequency are, for example, alternately transmitted from the respective corresponding transducer, and the reflection signals thereof are alternately received thereby. The beam center determining module 1632 determines the accuracy of the reception strength of the single fish. The beam center determining module 1632 determines whether the single fish is within the directivity range of the transducer 11, specifically, whether the reflection signal is received from the single fish at substantially the center of the directivity range within which the ultrasonic waves are transmitted from the transducer 11, that is, whether a size of the single fish can highly accurately be detected with the reflection strength.

Further specifically, the beam center determining module 1632 calculates a ratio of the peak holding data, which is obtained from the ultrasonic wave with the high frequency and corresponds to the single fish candidate, and one of reception data that is obtained from the ultrasonic wave with the low frequency and sampled at the same depth position (or an average value of the reception data), when comparing the ratio with a predetermined threshold and if the ratio is within a predetermined range, determines that the peak holding data is from the single fish detected at an appropriate position, and if the ratio is not within the predetermined range, excludes the peak holding data from the single fish candidate. The case where the ratio is not within the predetermined range is a case where, when the single fish is detected with the wide directivity of the low frequency ultrasonic wave and, whereas, the single fish is not detected with the narrow directivity of the high frequency ultrasonic wave signal or is detected within the narrow directive range but at other than the center, the case where the value of the peak holding data on the high frequency side is relatively smaller than the case where the single fish is detected at substantially the center within the directivity range in the result, therefore, the ratio reaches outside the appropriate range.

The tracking processing module 1633 excludes the primary single fish candidate except for a case where the existence of the single fish (the same single fish) is detected at the same depth position continuously the predetermined number of times, for example, twice by the receptions due to continuous transmission triggers. Although this exclusion of the primary single fish candidate depends on a cycle of the transmission trigger (detection cycle), it is based on that there is a high possibility that the primary single fish candidate in a single reception only is not the single fish and is, for example, an interference signal or another unnecessary signal in consideration of a general swimming speed and detection cycle of fish and the directive width of the ultrasonic wave. The single fish secondary detection processor 163 deletes the data relating to the excluded single fish candidate from the data of the primary single fish candidate detected by the single fish primary detection processor 162 and stored in the RAM 16b. The rest of the data stored in the RAM 16b is determined as the single fish.

The fish body quantitative processor 164 calculates the fish body length by using the maximum peak holding data at the peak holding positions corresponding to the depth positions of all the single fishes ultimately detected by the single fish primary detection processor 162 and the single fish secondary detection processor 163. The fish body quantitative processor 164 firstly calculates the reflection strength TS from the level of the relevant maximum peak holding data and subsequently calculates the fish body length L from the reflection strength TS, for each single fish. The reflection strength TS has been known to be calculated from the following Equation (1).

$$TS = 20 \log_{10}(SIG) - G + TVG - SL - Me - kD \quad (1)$$

Here, "SIG" indicates the level of the reception signal from the single fish, "G" indicates a reception gain, "TVG" indicates a variable time gain that changes according to a distance to the target object (single fish), "SL" indicates the level of the transmission signal, and "Me" indicates a sensitivity of a reception wave sound pressure. The reflection strength TS is obtained as above, and the fish body length L is calculated from a well known equation for the reflection strength TS and the fish body length L as shown in Equation (2).

$$TS = 20 \log L + 20 \log A \quad (2)$$

Here, "A" indicates a coefficient that is determined by the signal frequency and a fish species. The coefficient A of the fish species may be constant or, for example, may be read from a memory stored in advance with (for each fish species or a few kinds of values) suitable values of the coefficient A using required information among a marine area, the depth, a season, and a water temperature, and inserted to Equation (2).

Among the fish body lengths L calculated for the same single fish detected through a plurality of detections, for example, a maximum value is determined to be the fish body length L of the single fish and is stored within an appropriate range of the RAM 16b.

The display processor 165 displays, for example, the detection image obtained from the reception signal and the processed information, on the display 18. The detection image displayed on the screen 181 is generated by, for example, converting the maximum peak holding data acquired at the peak holding cycle into a form according to the level of the data. The display processor 165 repeatedly reads out the image information for one screen image to the display 18 at a predetermined cycle while repeatedly developing the image information for one screen image to the video RAM module 160*b* for every detection cycle, and thereby, draws a static image on the screen 181 as shown in the FIG. 5 as an example. Further, for performing a scroll display by one vertical line every time the transmission is triggered, the display processor 165 rewrites to update the contents in the video RAM 160*b* by scrolling addresses thereof by one vertical line and, at the same time, writes latest reception information in an address position that is vacant due to the scroll. Further, the display processor 165 may display, for example, the body length L of the single fish by number value at a position corresponding to the display position of the single fish image S2 (see FIG. 5), such as horizontally right next to the image S2 as needed.

The display processor 165 obtains the data to be displayed in one pixel from the maximum peak holding data based on the number of the maximum peak holding data and the number of the pixels in the depth direction within the set detection range. For example, in a mode in which the peak holding cycle is comparatively elongated as the detection range is wider, the size of the maximum peak holding data may be scaled with a ratio that is constant at all times and written into the video RAM 160*b*.

Alternatively, a predetermined single fish image may be drawn at the depth position where the single fish is detected. In this case, the fish body information is further read out, and the size, intensity or, with the display 18 where the display may be in color, the display color of the display image may be changed according to the fish body length information. In this case, the reception data and the maximum peak holding data is not required to be used as the image for the displaying, and other processed data may be used for the displaying.

Note that, the following modes may be adopted for the present invention.

(1) In this embodiment, the reception data is generated through sampling by the AD converter 15 and the peak holding processing is performed on the reception data; however, the reception data may directly be performed with the peak holding processing at a required cycle in association with the detection range, without the sampling by the AD converter 15. Note that, by having the AD converter 15 acquire the reception data, the reception data may be used for other processing and, after the entire image including the aging direction on the screen 181 is switched together when switching the detecting range, the reception data may be rewritten to be displayed so as to be in correspondence to a detection range after the switch.

(2) In this embodiment, the length of the peak holding cycle is changed in proportion to the width of the detection range so that the number of the peak holding data corresponds to the number of the pixels in the depth direction (i.e., the number thereof match with each other or the ratio therebetween is constant), for example, if the length of the detection range is doubled, the peak holding cycle is also doubled so that the number of the peak holding data corresponds to the number of the pixels in the depth direction. However, the peak holding cycle is not necessarily in association with the switch of the detection range. For example, the peak holding cycle may be set to a predetermined cycle in advance and the peak holding processing, the single fish detection processing, and the fish body quantitative processing are performed using the peak holding data obtained therefrom. Further, regarding the displaying, the display processor 165 calculates the number of the peak holding data corresponding to one pixel from a ratio of the number of the acquired peak holding data and the number of the pixels of the screen 181 in the depth direction where, if the ratio is 1:1 or above, data for displaying for one pixel is created by, for example, averaging the peak holding data corresponding to the ratio, and whereas, if the ratio is below 1:1, the same data is displayed in a plurality of pixels corresponding to the ratio. For example, if the number of the peak holding data is double the number of the pixels, an average value of two peak holding data in the depth direction is obtained and is displayed in one pixel and, conversely, if the number of the peak holding data is a half of the number of the pixels, one peak holding data is displayed in two pixels in the depth direction.

(3) In this embodiment, the fish body quantitative processor 164 calculates the fish body length L; however, it may not be limited to this, and various quantitations may further be performed in addition to the fish body length L.

(4) In this embodiment, the example of performing the underwater detection with the general ultrasonic wave beam is explained; however, the ultrasonic wave beam that is proposed in JP2005-249398A by the present inventors may be adopted. That is, the FM signal of which the frequency changes (chirp) in terms of time is used as the transmission signal, and only the predetermined signal is extracted from the returned signal by the correlation processing at the time of signal reception. Thereby, at the time of signal transmission, the detection distance can be elongated by widening the time width (pulse width) of the transmission signal, and at the time of signal reception, the reception signal with the short time width (pulse width) can be acquired, therefore, the resolution of the echo is improved by the pulse compression and the detection accuracy of the single fish may be improved. Further specifically, the correlation processing is basically performed by using a matched filter. The matched filter performs, while changing a matching degree of the reception signal received by the transducer and a reference signal by gradually shifting phases of the reference signal and the reception signal, a product-sum operation on the level of the reception signal and the level of the reference signal at each time point of the change, and extracts the reception signal with a short time width with which the correlation output is high, based on the calculation result.

(5) In this embodiment, the level rising and level falling of the signal indicating the single fish are determined using the minimum and maximum peak holding data; however, it is not limited to this and, for example, either one of the level rising and level falling, preferably the level rising is determined as explained in this embodiment, whereas the other one (the level falling) may be determined by another determining method, preferably a simpler method considering that the falling determination processing is performed during the other determination (the rising determination processing). For example, the level falling may be determined by determining whether the maximum (or minimum) peak holding data is decreased to a preset level of determining that the signal is not obtained, or by determining whether the maximum (or minimum) peak holding data is decreased to a level equivalent to a minimum value used in the rising determination.

(6) In this embodiment, the example of using the ultrasonic wave pulse as the detection pulse and detecting the single fish underwater is explained; however, it is not limited to the detection of the single fish and may be applied to a case where another target object underwater is set as a detection target, and further to a detection of, for example, a ship on the sea by using a radar pulse (microwave pulse) that is discharged (transmitted) from a radar antenna as the detection pulse.

(7) In this embodiment, the signal processing system 16 is configured as a system including the plurality of processors; however, it may be configured as a single processor serving as hardware including the plurality of modules and sub-modules serving as software.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A target object detection device for outwardly transmitting a detection pulse and detecting a target object based on a returned reception signal, comprising:
   a converter configured to convert reception signals into sampled reception signals at a sampling cycle;
   a first peak holding module configured to extract, at each of a predetermined cycle, a maximum value of the sampled reception signals obtained in the predetermined cycle, the predetermined cycle being longer than the sampling cycle;
   a second peak holding module configured to extract, at the same predetermined cycle, a minimum value of the sampled reception signals obtained in the predetermined cycle; and
   a target object determiner configured to determine a level rising and a level falling of the sampled reception signal indicating the target object by using a gradient between the minimum and maximum values extracted at different peak holding positions.

2. The target object detection device of claim 1, wherein the target object determiner calculates the gradient based on the minimum and maximum values at the peak holding positions distanced by one or more of the predetermined cycles.

3. The target object detection device of claim 1 or 2, wherein the target object determiner compares, with a rising determination threshold, a difference value between the minimum and maximum values used in calculating the gradient of the level rising, and if the difference value exceeds the rising determination threshold, the determiner determines that the difference value indicates the level rising of the signal indicating the target object.

4. The target object detection device of claim 1, wherein the target object determiner compares, with a falling determination threshold, a difference value between the maximum and minimum values used in calculating the gradient of the level falling, and if the difference value exceeds the falling determination threshold, the determiner determines that the difference value indicates the level falling of the signal indicating the target object.

5. The target object detection device of claim 1, wherein the first and second peak holding modules change the predetermined cycle according to a detection range setting.

6. The target object detection device of claim 1, wherein the detection pulse is an ultrasonic pulse that is transmitted underwater, and the target determiner determines a single fish as the target object.

7. A method of outwardly transmitting a detection pulse and detecting a target object based on a returned reception signal, comprising:
   converting reception signals into sampled reception signals at a sampling cycle;
   extracting, at each of a predetermined cycle, a maximum value of the sampled reception signals obtained in the predetermined cycle, the predetermined cycle being longer than the sampling cycle;
   extracting, at the same predetermined cycle, a minimum value of the sampled reception signals obtained in the predetermined cycle; and
   determining a level rising and a level falling of the sampled reception signal indicating the target object by using a gradient between the minimum and maximum values extracted at different peak holding positions.

8. The method of claim 7, wherein the detection pulse is an ultrasonic pulse that is transmitted underwater, and the determining the level rising and the level falling includes determining a single fish as the target object.

* * * * *